(12) United States Patent
Griffin et al.

(10) Patent No.: US 8,899,852 B2
(45) Date of Patent: Dec. 2, 2014

(54) APPARATUS PERTAINING TO A KEYBOARD COMPRISED OF PHYSICALLY-DISCRETE HINGED SEGMENTS

(75) Inventors: Jason Tyler Griffin, Kitchener (CA); Martin Philip Riddiford, London (GB)

(73) Assignee: BlackBerry Limited, Waterloo (CA)

( * ) Notice: Subject to any disclaimer, the term of this patent is extended or adjusted under 35 U.S.C. 154(b) by 156 days.

(21) Appl. No.: 13/551,951

(22) Filed: Jul. 18, 2012

(65) Prior Publication Data

US 2014/0022710 A1 Jan. 23, 2014

(51) Int. Cl.
*G06F 3/02* (2006.01)

(52) U.S. Cl.
CPC ............... *G06F 3/02* (2013.01); *G06F 3/0202* (2013.01); *G06F 3/0221* (2013.01)
USPC ...................... 400/495; 400/472; 361/679.09

(58) Field of Classification Search
CPC ... H04M 1/0235; H04M 1/0237; H04M 1/23; H04M 1/236; G06F 3/0202; G06F 3/0221; G06F 1/1666
USPC ............. 400/472, 490, 495, 496; 361/679.09
See application file for complete search history.

(56) References Cited

U.S. PATENT DOCUMENTS

| | | | | |
|---|---|---|---|---|
| 6,996,426 | B2* | 2/2006 | Granberg | .................... 455/575.4 |
| 2007/0133788 | A1* | 6/2007 | Ladouceur et al. | ...... 379/433.07 |
| 2010/0124003 | A1* | 5/2010 | Liu et al. | .................. 361/679.01 |
| 2013/0033844 | A1* | 2/2013 | Ladouceur et al. | ........... 361/807 |

FOREIGN PATENT DOCUMENTS

| | | | |
|---|---|---|---|
| EP | 1795994 A1 | 6/2007 | |
| GB | 2396769 A | 6/2004 | |
| JP | 55150055 A | * 11/1980 | ............. G06F 15/02 |
| WO | 01/54384 A1 | 7/2001 | |
| WO | 2004/032464 A1 | 4/2004 | |

OTHER PUBLICATIONS

Extended European Search Report from related European Patent Application No. 12176856.8 dated Feb. 21, 2013; 7 pages.
Article 94(3) EPC related European Patent Application No. 12176856.8 dated Mar. 4, 2014; 6 pages.

* cited by examiner

*Primary Examiner* — Daniel J Colilla
(74) *Attorney, Agent, or Firm* — Fitch, Even, Tabin & Flannery LLP

(57) ABSTRACT

A keyboard comprises a plurality of keycap-bearing physically-discrete segments that are hingeably coupled to one another. When in a non-deployed configuration, the keycap-bearing physically-discrete segments are disposed on a back side of a corresponding housing such that the keys face outwardly away from that back side of the housing. When in a deployed configuration, the keycap-bearing physically-discrete segments are disposed substantially planar with respect to that same housing and face outwardly away from a front side of the apparatus.

11 Claims, 3 Drawing Sheets

APPARATUS PERTAINING TO A KEYBOARD COMPRISED OF PHYSICALLY-DISCRETE HINGED SEGMENTS

RELATED APPLICATIONS

This application is related to co-pending and co-owned U.S. patent application Ser. No. 13/551,927, entitled APPARATUS PERTAINING TO HINGED ROWS OF KEYCAPS and filed on even date herewith, which is incorporated by reference in its entirety herein.

FIELD OF TECHNOLOGY

The present disclosure relates to keyboards.

BACKGROUND

Keyboards of various kinds are known in the art. Keyboards are typically comprised of a plurality of keycaps (such as depressible buttons, touch-sensitive surfaces, and so forth) that permit a user to selectively enter any of a variety of alphanumeric characters and/or to input corresponding instructions or selections. Two common examples in these regards are the so-called QWERTY-layout keyboard and the so-called telephone-layout keypad.

Small portable communication devices (such as so-called smartphones) often include a keyboard. To minimize the device's footprint those keyboards are sometimes disposed on a lower plane than the device's display. In these cases the display and the keyboard sometimes slide parallel to one another to bring the keyboard into a deployed position. In some other cases the keyboard comprises two or more multi-row segments that pivot in a planar fashion with respect to one another to permit the keyboard segments to be stored, again parallel to the device's display, as a stack of planar members within the device.

DETAILED DESCRIPTION

Figure 1:
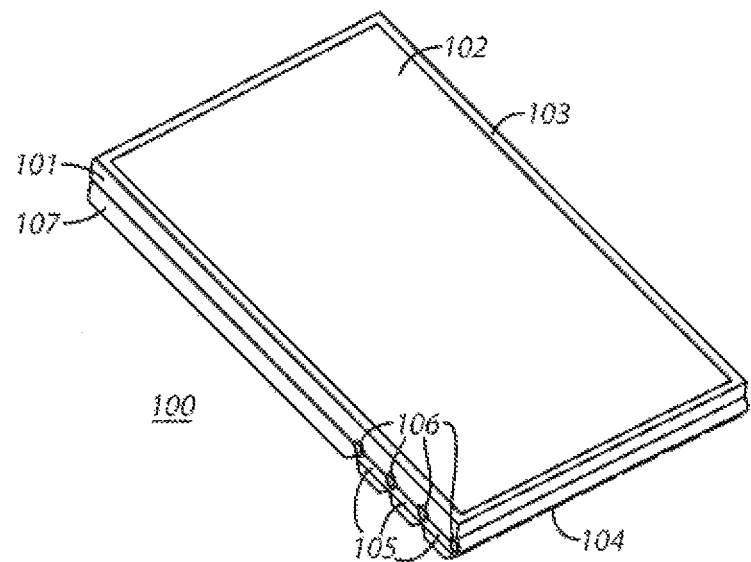
FIG. 1 is a perspective view in accordance with the disclosure.

The following describes an apparatus and method pertaining to a keyboard comprised of a plurality of keycap-bearing physically-discrete segments that are hingeably coupled to one another wherein the keyboard is configured to have a deployed configuration and a non-deployed configuration. By one approach, when in the non-deployed configuration, the keycap-bearing physically-discrete segments are disposed on a back side of a corresponding housing such that the keys face outwardly away from that back side of the housing. When in the deployed configuration, the keycap-bearing physically-discrete segments are disposed substantially planar with respect to that same housing and face outwardly away from a front side of the apparatus.

By one approach the keycap-bearing physically-discrete segments move from the non-deployed configuration to the deployed configuration such that individual ones of the keycap-bearing physically-discrete segments reach their respective deployed configuration one-by-one. This can comprise, for example, moving the keycap-bearing physically-discrete segments via a caterpillar movement when moving the keycap-bearing physically-discrete segments from a non-deployed configuration to a deployed configuration and vice versa.

So configured, a corresponding device such as a portable communication device can have both a small footprint and a small vertical depth when the keyboard is non-deployed while also offering a keyboard that can be readily and easily deployed when needed. These teachings are highly leverageable and are also easily scaled to accommodate a wide variety of application settings.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

For the sake of illustration and without intending any particular limitations in these regards, FIG. 1 presents a personal communications device 100 having a housing 101 that includes and supports a display 102 that faces outwardly and away from a front side 103 of the device 100. This personal communications device 100 further includes a keyboard 104 that is comprised of a plurality of keycap-bearing physically-discrete segments 105 (hereinafter referred to from time to time as "segments") that are hingeably coupled to one another (and/or the housing 101 or a bottom member 107) via corresponding hinges 106.

In FIG. 1 the segments 105 of the keyboard 104 are shown disposed flush on a back side of the housing 101 and with their keycaps (not shown in this view) facing outwardly and away from the back side of the device 100. This configuration is referred to herein as the non-deployed configuration. So disposed, the keyboard 104 adds essentially nothing to the footprint of the personal communications device 100.

Figure 2:
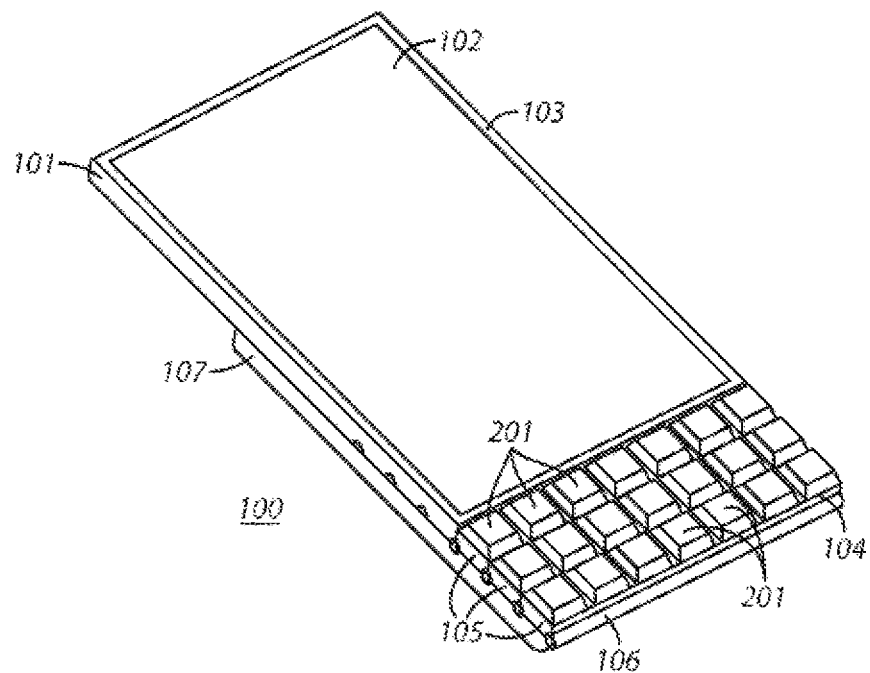
FIG. 2 is a perspective view in accordance with the disclosure.

FIG. 2 depicts the segments 105 of the keyboard 104 disposed substantially adjacent to one another and planar with respect to the housing 101 such that the keycaps (some of which are denoted by reference numeral 201) on those segments 105 face outwardly away from the front side 103 of the device 100. By way of further illustration and again without intending any limitations in these regards, these segments 105 are co-planar with the housing 101 as well. This configuration is referred to herein as the deployed configuration.

In the example provided the keyboard 104 comprises three separate segments 105. It will be understood that these teachings will accommodate essentially any plural number of segments 105 and that three such segments are used here for the sake of simplicity and clarity as a non-limiting illustrative example.

In the example provided, for the sake of illustration each segment 105 has seven keycaps 201. It will be understood that fewer, or additional, keycaps can be included as desired. It will be understood that these teachings will accommodate essentially any number of keycaps. By one approach, for example, the number of rows and the number of keycaps can be sufficient to comprise a standard QWERTY-layout keyboard. It will also be understood that these teachings do not require that each of the segments 105 have a same and identical number of keycaps 201 nor that the key caps 201 all be of the same size and/or shape.

It will be similarly understood that the keycaps 201 themselves can correspond to any of a variety of key-based mechanisms. This can include, by way of example, touch-sensitive surfaces that do not move when asserted as well as moving surfaces such as dome switch-based keys. These teachings will also accommodate a mixed approach in these regards where keys having touch-sensitive surfaces are used along with dome switch-based keys if desired (to accommodate detecting, for example, a gesture-based input provided via the keyboard).

In this deployed configuration the keyboard 104 is physically accessible to the user in a manner that also permits simultaneous viewing of the display 102. By way of further illustration and again without intending any limitations in these regards, the bottom member 107 provides vertical support for the keyboard 104 to thereby better facilitate the user asserting specific keycaps 201 to thereby enter alphanumeric content and so forth.

By one approach, these segments 105 as comprise the keyboard 104 move from the non-deployed configuration to the deployed configuration such that individual ones of the segments 105 reach their respective deployed configuration (as shown in FIG. 2) one-by-one. As described below for the sake of example, this can include moving the segments 105 via a caterpillar movement. It will be understood that no limitations are intended by way of the specificity of the following example.

Figure 3:
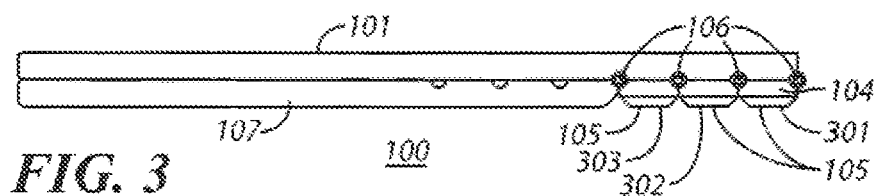
FIG. 3 is a side-elevational view in accordance with the disclosure.
Figure 4:
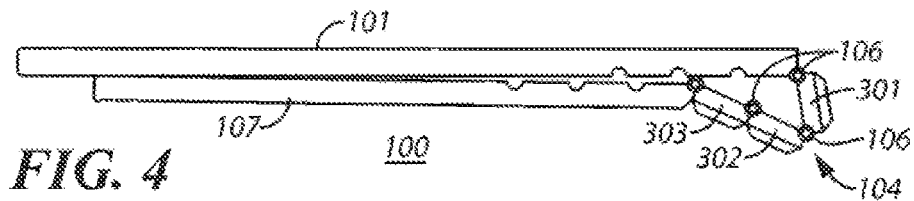
FIG. 4 is a side-elevational view in accordance with the disclosure.

FIG. 3 presents a side profile of the portable communications device 100 as is otherwise shown in FIG. 1. Here, the keyboard 104 is in the fully non-deployed configuration. In this configuration the aforementioned bottom member 107 is flush against the backside of the device's housing 101. If desired, this positioning can be encouraged and maintained via one or more securement mechanisms. As one example in these regards the bottom member 107 can be held in place with respect to the housing 101 via one or more magnets (not shown). The magnets can be of sufficient number, placement, and strength as to tend to hold the bottom member 107 in place while also permitting a user to nevertheless selectively overcome the magnetic attraction and move the bottom member 107 with respect to the housing 101 when desired. As another example in these regards, any of a variety of snaps, clips, mechanical sliders, and so forth can serve in these same regards, in lieu of magnets or in combination therewith.

Figure 9:
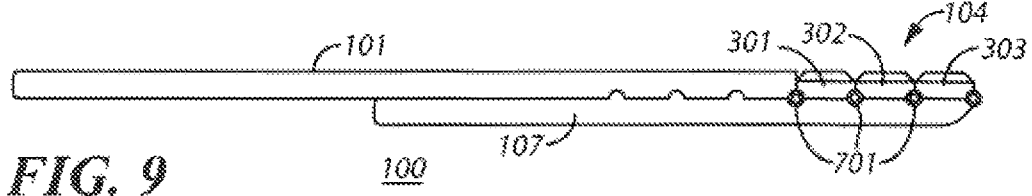
FIG. 9 is a side-elevational view in accordance with the disclosure.

FIGS. 4 through 8 depict the caterpillar-like movement of the segments 105 of the keyboard 104 from the fully non-deployed configuration to the fully-deployed configuration depicted in FIGS. 2 and 9. Generally speaking, the user manipulates the bottom member 107 by hand to move the part of the bottom member 107 that is proximal to the keyboard 104 away from the housing 101 and towards the end of the housing 101. If desired, the extent to which the bottom member 107 can be moved away from the housing 101 can be limited using, for example, one or more sleeves, bands, guides, straps, or the like (not shown). Such a restraint is not shown here for the sake of clarity.

The moving bottom member 107 serves as a plate that, being hingeably coupled to one of the segments 303, causes the segments to move towards the deployed configuration. In particular, the individual segments 301, 302, and 303 move about their hinged connections with each other as well as the housing 101 and the bottom member 107 to sequentially one-by-one assume a deployed position. This, of course, moves the aforementioned keycaps 201 from facing downwardly on the underside of the device 100 to facing upwardly on the upper side of the device 100.

The keyboard 104 readily returns from the deployed configuration to the non-deployed configuration by simply reversing the foregoing movements. As a result, in this illustrative example, the segments 105 that comprise the keyboard 104 move via a caterpillar movement regardless of whether the bottom member 107 moves forwardly or backwardly.

Figure 5:
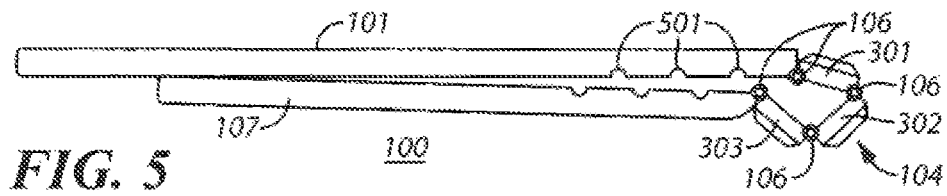
FIG. 5 is a side-elevational view in accordance with the disclosure.
Figure 6:
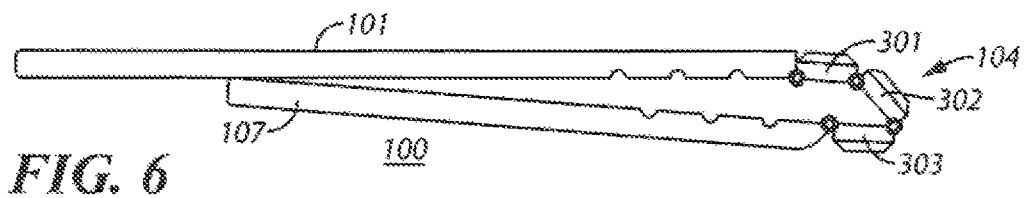
FIG. 6 is a side-elevational view in accordance with the disclosure.
Figure 7:
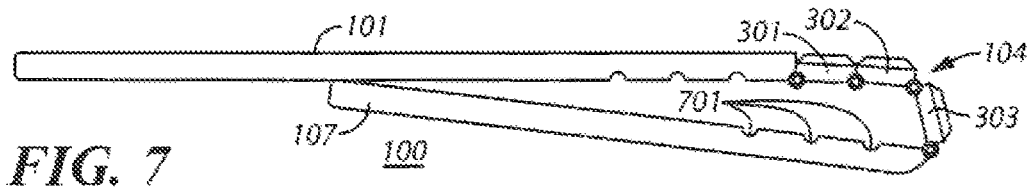
FIG. 7 is a side-elevational view in accordance with the disclosure.
Figure 8:
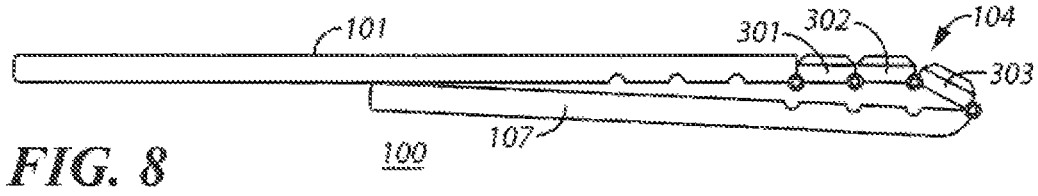
FIG. 8 is a side-elevational view in accordance with the disclosure.

To facilitate stable and secure storage of the keyboard 104 when stowed in the non-deployed configuration the underside of the housing 101 includes a plurality of notches 501 formed therein as shown, for example, in FIG. 5. These notches 501 are positioned and shaped to conformally receive the aforementioned hinges 106 when the keyboard 104 is fully stowed as shown in FIG. 3. The bottom member 107 can also have similar notches 701 formed therein (as seen, for example, in FIG. 7) to conformally receive the keyboard hinges 106 when the keyboard 104 is fully deployed as shown in FIG. 9. So configured, the bottom member 107 provides physical vertical support for the segments 105 that comprise the keyboard 104.

Figure 10:
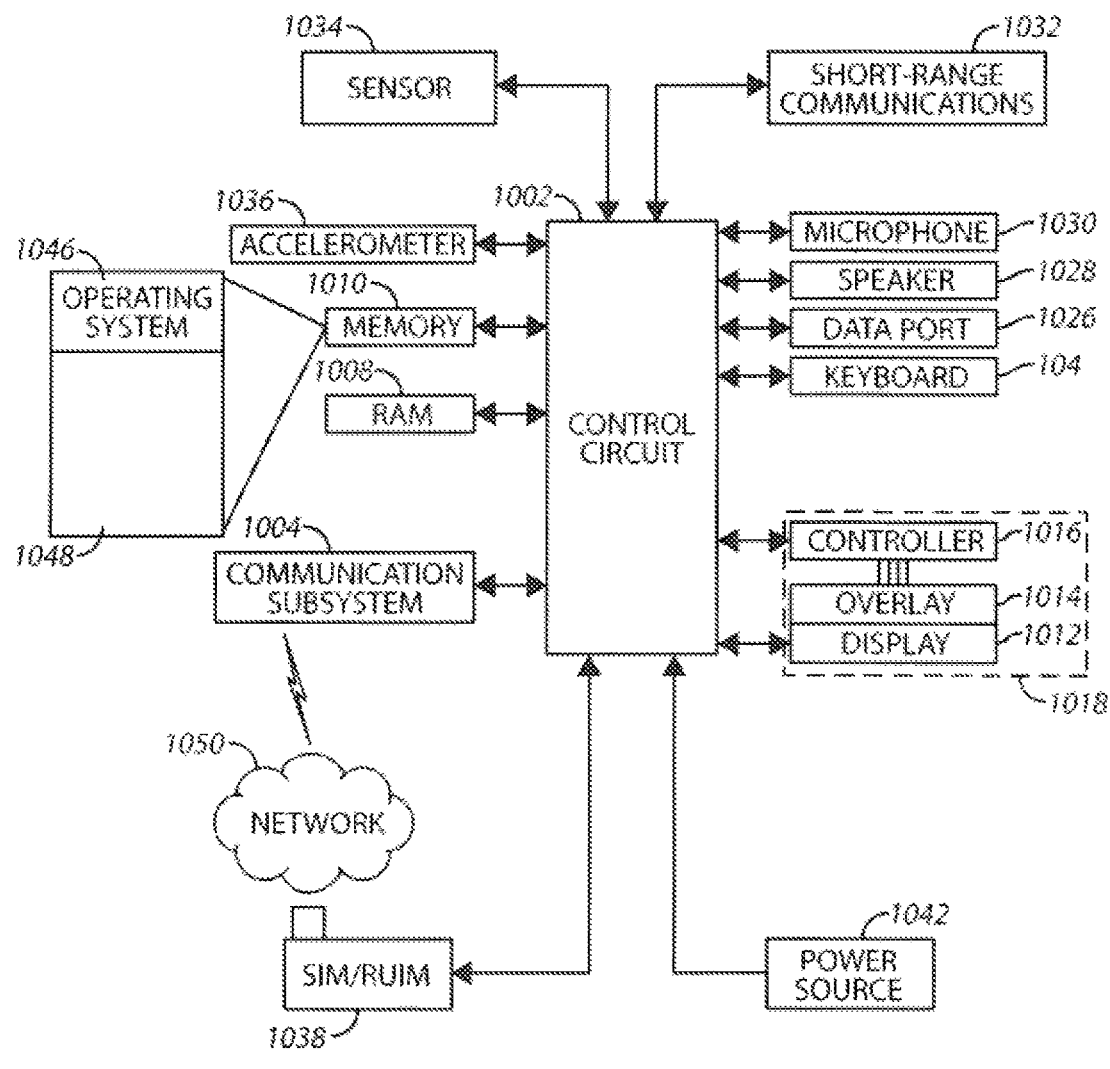
FIG. 10 is a block diagram in accordance with the disclosure.

As noted above, such a keyboard 104 can be readily employed in conjunction with a portable communications device 100. Referring to FIG. 10 a more specific example in those regards will be provided. Again, the specifics of this example are not to be taken as limitations with respect to the disclosed concepts.

An exemplary portable communication device 100 includes a control circuit 1002 that controls the overall operation of the portable electronic device. Communication functions, including data and voice communications, are performed through a communication subsystem 1004. The communication subsystem receives messages from and sends messages to a wireless network 1050. The wireless network 1050 may be any type of wireless network, including, but not limited to, data wireless networks, voice wireless networks, and networks that support both voice and data communications. A power source 1042, such as one or more rechargeable batteries or a port to an external power supply, powers the device 100.

The control circuit 1002 interacts with other elements, such as Random Access Memory (RAM) 1008, memory 1010, a display 1012 with a touch-sensitive overlay 1014 operably coupled to an electronic controller 1016 that together comprise an optional touch-sensitive display 1018, a keyboard 105 as described above, a data port 1026, a speaker 1028, a microphone 1030, a short-range communication subsystem 1032, a sensor 1034 that detects when the keyboard 105 is in the deployed and/or non-deployed state as described above, and an accelerometer 1036.

To identify a subscriber for network access, the portable communication device 100 may utilize a Subscriber Identity Module or a Removable User Identity Module (SIM/RUIM) card 1038 for communication with a network, such as the wireless network 1050. Alternatively, user identification information may be programmed into the memory 1010.

The portable communication device 100 includes an operating system 1046 and software programs, applications, or components 1048 that are executed by the control circuit 1002 and are typically stored in a persistent, updatable store such as the memory 1010. Additional applications or programs may be loaded onto the portable electronic device through the wireless network 1050, the data port 1026, the short-range communications subsystem 1032, or any other suitable subsystem as may be available. The memory 1010 may comprise a non-transitory storage media that stores executable code, when executed, causes one or more of functions or actions as described herein.

By one approach, the control circuit 1002 can be configured to automatically respond to the deployed and non-deployed state of the keyboard 105 (as determined, for example, via the aforementioned sensor 1034) in any of a variety of ways. As one simple example in these regards, when the keyboard 105 is fully deployed the control circuit 1002 can present, via the display 1012, a user interface that presumes data entry via the keyboard 105. When, however, the keyboard 105 is stowed in the non-deployed configuration as described above, the control circuit 1002 can be configured to ignore keyboard assertions and to present a user interface that presumes data entry via the touch-based overlay 1014, via a virtual keyboard or other user interface displayed on the display 1018, for example.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
   a housing;
   a keyboard comprised of a plurality of keycap-bearing physically-discrete segments that are hingeably coupled to one another, wherein the keyboard is configured to have a deployed configuration and a non-deployed configuration, the keycap-bearing physically-discrete segments being all disposed on a back side of the housing and facing outwardly away from a back side of the apparatus when in the non-deployed configuration and being disposed substantially planar with respect to the housing and facing outwardly away from a front side of the apparatus when in the deployed configuration, and wherein, when the keycap-bearing physically-discrete segments move from the non-deployed configuration to the deployed configuration, individual ones of the keycap-bearing physically-discrete segments reach their respective deployed configuration one-by-one;
   a plate hingeably coupled to one of the keycap-bearing physically-discrete segments and configured to move with the keycap-bearing physically-discrete segments when the keycap-bearing physically-discrete segments move back and forth between the non-deployed configuration and the deployed configuration, wherein the plate has recesses formed therein to receive segment hinges when the keycap-bearing physically-discrete segments are in the deployed configuration to thereby dispose the plate closely to an underside surface of the keycap-bearing physically-discrete segments and thereby provide physical support for the keycap-bearing physically-discrete segments when in the deployed configuration.

2. The apparatus of claim 1 wherein the apparatus comprises a portable communications device.

3. The apparatus of claim 1 further comprising:
   a display supported by the housing facing outwardly away from the front side of the apparatus.

4. The apparatus of claim 1 wherein the keyboard comprises, at the least, a QWERTY-layout keyboard.

5. The apparatus of claim 1 wherein each of the keycap-bearing physically-discrete segments comprises a single row of keycaps.

6. The apparatus of claim 5 wherein the plurality of keycap-bearing physically-discrete segments comprise at least three keycap-bearing physically-discrete segments.

7. The apparatus of claim 1 wherein the keycap-bearing physically-discrete segments are configured to move from the non-deployed configuration to the deployed configuration via a caterpillar movement.

8. The apparatus of claim 1 wherein the keycap-bearing physically-discrete segments are configured to move from the deployed configuration to the non-deployed configuration via a caterpillar movement.

9. The apparatus of claim 1 wherein the keycap-bearing physically-discrete segments are configured to move between the deployed and non-deployed configurations via a caterpillar movement.

10. An apparatus comprising:
    a housing;
    a keyboard comprised of a plurality of keycap-bearing physically-discrete segments that are hingeably coupled to one another, wherein the keyboard is configured to have a deployed configuration and a non-deployed configuration, the keycap-bearing physically-discrete segments being disposed on a back side of the housing and facing outwardly away from a back side of the apparatus when in the non-deployed configuration and being disposed substantially planar with respect to the housing and facing outwardly away from a front side of the apparatus when in the deployed configuration, and wherein, when the keycap-bearing physically-discrete segments move from the non-deployed configuration to the deployed configuration, individual ones of the keycap-bearing physically-discrete segments reach their respective deployed configuration one-by-one;
    wherein the housing has recesses formed in the back side of the housing to receive segment hinges when the keycap-bearing physically-discrete segments are in the non-deployed configuration to thereby dispose the back side of the housing closely to an underside surface of the keycap-bearing physically-discrete segments when in the non-deployed configuration.

11. A portable communications device comprising:
    a housing;
    a display supported by the housing and facing outwardly away from a front side of the portable communications device;
    a keyboard comprised of a plurality of keycap-bearing physically-discrete segments that are hingeably coupled to one another, wherein the keyboard is configured to have a deployed configuration and a non-deployed configuration, the keycap-bearing physically-discrete segments all being disposed on a back side of the housing and facing outwardly away from a back side of the portable communications device when in the non-deployed configuration and being disposed substantially planar with respect to the housing and facing outwardly away from a front side of the portable communications device when in the deployed configuration, and wherein, when the keycap-bearing physically-discrete segments move from the non-deployed configuration to the deployed configuration, individual ones of the keycap-bearing physically-discrete segments reach their respective deployed configuration one-by-one;

a plate hingeably coupled to one of the keycap-bearing physically-discrete segments and configured to move with the keycap-bearing physically-discrete segments when the keycap-bearing physically-discrete segments move back and forth between the non-deployed configuration and the deployed configuration, wherein the plate has recesses formed therein to receive segment hinges when the keycap-bearing physically-discrete segments are in the deployed configuration to thereby dispose the plate closely to an underside surface of the keycap-bearing physically-discrete segments and thereby provide physical support for the keycap-bearing physically-discrete segments when in the deployed configuration.

\* \* \* \* \*